United States Patent Office 3,196,134
Patented July 20, 1965

3,196,134
POLYMERIZATION PROCESS FOR POLYVINYL ESTERS USING AN INSOLUBLE METALLIC SOAP AS SOLE EMULSIFIER
Frank J. Donat, Cleveland, and Edwin H. Baker, Cuyahoga Falls, Ohio, assignors to The B. F. Goodrich Company, New York, N.Y., a corporation of New York
No Drawing. Filed Apr. 19, 1962, Ser. No. 188,884
17 Claims. (Cl. 260—78.5)

This invention relates to emulsion type vinyl ester resins and more particularly pertains to spherical, uniform particle size vinyl acetate resins and to a process for preparing same in an aqueous emulsion comprising the use of insoluble soaps as the sole emulsifiers.

The chemical literature reveals little information concerning methods for the provision of spherical, uniform particle size vinyl ester resins. However, methods are shown for the provision of spherical, uniform particle size resins other than the vinyl esters. Only two methods of any consequence are shown for these other resins. One method is the seeding process and the other is the emulsifier deficient procedure. Both of these methods require highly critical techniques.

There are many, diverse uses for a spherical, uniform particle size vinyl acetate resin. For example, spherical, uniform particle size vinyl acetate resins are useful as secondary calibration standards for investigations in electron microscopy, light microscopy, light scattering, sedimentation studies and aerosol studies. Latex paint formulation theories state that there are reasons for believing that a film-forming, uniform particle size vinyl acetate latex resin is desirable to minimize the problems of stability and reproducibility of flow properties of latex paints. U.S. Patent 2,553,916 teaches that powders of synthetic resins that are composed of a mixture of two uniform particle size resins with the larger uniform particle size resin having a particle size at least six times the size of the smaller uniform particle size resin require a minimum of plasticizer. U.S. Patent 2,553,916 states that it is advantageous in synthetic resin paste formulations to bring about a paintable or pourable condition with a minimum of liquid plasticizer. A large, uniform particle size vinyl acetate latex resin is useful in paper treatment for reducing the depth of resin impregnation.

It will become apparent from the discussion of our invention that our uniform particle size vinyl acetate resins have utility in the aforementioned areas.

The use of materials commonly referred to as "insoluble soaps," "heavy metal soaps," "insoluble metal soaps," "polyvalent metal soaps," "driers" and "metallic soaps" as the sole emulsifiers for the emulsion polymerization of vinyl acetate or mixtures of vinyl acetate with other copolymerizable monomers was not known at the time of the present invention. The prior art does not teach or suggest that such soaps would have any utility, per se, in the polymerization reaction. There is no indication in the prior art that such materials would have any value as emulsifiers in any aqueous system particularly in view of their known very limited solubility in water. The "insoluble soaps" embodied herein are not regarded as emulsifiers for water systems. This invention, which is discussed in more detail below, is indeed unexpected in view of the prior art.

It is an object of this invention to provide vinyl acetate resins that have spherical, uniform size particles. Another object of this invention is to provide spherical, uniform particle size vinyl acetate resins in a single step polymerization. Still another object is the provision of a method for preparing spherical, uniform particle size vinyl acetate resins having a predetermined particle size.

The following description and examples will show the accomplishment of the foregoing and other objects.

We have discovered a method for preparing spherical, uniform particle size polyvinyl ester resins comprising conducting the polymerization of a monomer mixture of more than 50% of at least one vinyl ester monomer and preferably from 60 to 100% by weight of at least one vinyl ester and from 0 to less than 50% and preferably from 0 to 40% by weight of at least one other copolymerizable monomer containing monoolefinic or conjugated diolefinic unsaturation in water with agitation in the presence of an insoluble soap as the sole emulsifier. Included among the useful vinyl ester monomers are vinyl acetate, vinyl propionate, vinyl butyrate, vinyl benzoate, vinyl laurate, isopropenyl acetate, isopropenyl caproate and the like. Preferred of the vinyl ester monomers is vinyl acetate.

Thus, the vinyl acetate resins included herein are homopolymers of vinyl acetate, copolymers and interpolymers of at least 60% by weight of vinyl acetate and up to 40% by weight of one or more various other vinyl monomers copolymerizable with vinyl acetate.

Included in the group of various other vinyl monomers copolymerizable with the vinyl acetate are those monomers containing a grouping selected from the class consisting of

and

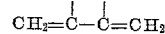

groupings. Such vinyl monomers include vinyl halides such as vinyl chloride, vinyl bromide, vinyl fluoride, vinylidene chloride, vinylidene bromide, vinylidene fluoride, chlorotrifluoro ethylene, 1,2-dichloroethylene, and the like; the acrylate esters such as methyl acrylate, ethyl acrylate, propyl acrylate, isopropyl acrylate, the butyl acrylates, the amyl acrylates, the hexyl acrylates, the heptyl acrylates, the octyl acrylates, nonyl acrylates, decyl acrylates, the dodecyl acrylates, phenyl acrylate, cyclohexyl acrylate, 2-cyanoethyl acrylate, 2-hydroxyethyl acrylate and the like; the methacrylate esters such as methyl methacrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylates, cyclohexyl methacrylates and the like; the dienes such as 1,3-butadiene, 1,3-butadiene having the 2 position substituted with a member selected from the group consisting of halo atoms and alkyl groups of from 1 to 4 carbon atoms, 1,3-butadiene substituted at the 2 and 3 positions with members selected from the group consisting of halo atoms and alkyl groups of from 1 to 4 carbon atoms. Such substituted 1,3-butadienes include 2,3-dimethyl-1,3-butadiene, 2,3-dichloro-1,3-butadiene, 2-methyl-3-chloro-1,3-butadiene and the like; vinyl cyanides such as acrylonitrile, methacrylonitrile, fumaronitrile maleonitrile, and the like and others; the maleate esters such as dimethyl maleate, diethyl fumarate, the dipropyl maleates, the dibutyl maleates, the diamyl maleates, the dihexyl maleates, the dioctyl maleates, the didecyl maleates, the didodecyl maleates, the dihexadecyl maleates, the dieicosyl maleates, dicyclohexyl maleate, diphenyl maleate, and the like; the fumarate esters such as dimethyl fumarate, diethyl fumarate, the dipropyl fumarates, the dibutyl fumarates, the diamyl fumarates, the dihexyl fumarates, the diheptyl fumarates, the dioctyl fumarates, the didecyl fumarates, the didodecyl fumarates, the dihexadecyl fumarates, the dieicosyl fumarates, dicyclohexyl fumarate, diphenyl fumarate, and the like; the itaconate esters such as dimethyl itaconate, diethyl itaconate, the dipropyl itaconates, the dibutyl itaconates, the diamyl itaconates, the dihexyl itaconates, the diheptyl itaconates, the dioctyl itaconates, the didecyl itaconates, the didodecyl itaconates, the dihexadecyl itaconates, the dieicosyl itaconates, dicyclohexyl itaconates, diphenyl itaconate; the methylene malonates such as dimethyl methylene malonate, diethyl methylene malonate, the dipropyl methylene malonates, the dibutyl methylene malonates, the diamyl methylene malonates, the dihexyl methylene malonates, the diheptyl methylene malonates, the dioctyl methylene malonates, the didecyl methylene malonates, the didodecyl methylene malonates, the dihexadecyl methylene malonates, the dieicosyl methylene malonates, dicyclohexyl methylene malonates, diphenyl methylene malonates, and the like; the citraconates such as dimethyl citraconate, the diethyl citraconate, the dipropyl citraconates, the dibutyl citraconates, the diamyl citraconates, the dihexyl citraconates, the diheptyl citraconates, the dioctyl citraconates, the didecyl citraconates, the didodecyl citraconates, the dihexadecyl citraconates, the dieicosyl citraconates, dicyclohexyl citraconate, diphenyl citraconate; the mesaconates such as dimethyl mesaconate, diethyl mesaconate, the dipropyl mesaconates, the dibutyl mesaconates, the diamyl mesaconates, the dihexyl mesaconates, the diheptyl mesaconates, the dioctyl mesaconates, the didecyl mesaconates, the didodecyl mesaconates, the dihexadecyl mesaconates, the dieicosyl mesaconates, dicyclohexyl mesaconates, diphenyl mesaconates, and the like; the monoolefins such as ethylene, propylene, the butylenes, the amylenes, the hexylenes, cyclohexene and the like; the vinyl ethers such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ether, vinyl phenyl ether, vinyl benzyl ether, and the like; the allyl esters and ethers such as allyl acetate, allyl laurate, allyl benzoate, allyl methyl ether, allyl ethyl ether and the like; the vinyl ketones such as vinyl methyl ketone, vinyl ethyl ketone, isopropenyl ketone and the like.

Most preferred are the interpolymers of from 60 to 100% by weight of vinyl acetate and from 0 to 40% by weight of at least one other monomer selected from the group consisting of alkyl esters of an alpha,beta olefinically unsaturated carboxylic acid wherein the carboxylic acid has from 3 to 6 carbon atoms and the alkyl ester group contains from 1 to 12 carbon atoms and preferably from 1 to 6 carbon atoms.

The metallic soaps or insoluble soaps useful as the sole emulsifiers in the present invention include the lithium and the polyvalent metal salts of saturated, unsaturated and substituted fatty acids. The polyvalent metal moieties of the soaps embodied herein include in general any metals of groups II, III and IV of the Mendeleef Periodic Table and more particularly include beryllium, barium, calcium, magnesium, strontium, cadmium, zinc, lead, tin, titanium and aluminum. The fatty acid moieties preferred in the insoluble soaps embodied herein are octanoic, stearic, oleic, linoleic, ricinoleic, palmitic, abietic and the like. Most preferred are the monobasic saturated fatty acids having from 8 to 22 carbon atoms. The emulsifiers embodied herein are most useful in the range of from 0.01 part to 5 parts by weight (per 100 parts of monomer) and preferably from 0.1 to 2.0 parts.

Most preferred in this invention are the insoluble soaps having the formula $(X-COO)_nM$ wherein X is an alkyl group having from 7 to 21 carbon atoms and M is a member selected from the group consisting of lithium, barium, calcium, magnesium, cadmium, zinc, lead, tin and aluminum and $n$ is a whole number equal to the valence of M.

The vinyl polymer latices of fine particle dispersions produced by the process of this invention generally contain polymer existing as uniform, spherical particles having average diameters of from 0.1 to 10 microns and more preferably from about 0.1 to 4 microns in diameter.

The process of this invention is carried out conveniently in laboratory apparatus for emulsion polymerizations or in other larger scale polymerization apparatus, preferably in the substantial absence of elemental oxygen and in the presence of a free-radical initiator at a temperature of about 100° C. or below, the temperature being measured at standard pressure. Thus, with superatmospheric pressure the reaction may be carried out at temperatures greater than 100° C. The polymerization reaction can be carried out at atmospheric, sub-atmospheric, or superatmospheric pressure. Preferably, the polymerization is carried out at a reaction temperature in the range of from about 30° C. to 100° C. In general, the polymerization temperature chosen does not influence the particle size of the product, but as those skilled in the art know lower temperatures tend to produce higher molecular weight polymers and higher temperatures tend to produce lower molecular weight polymers. It is also known that lower molecular weight resins soften at somewhat lower temperatures than their higher molecular weight analogues.

The free-radical initiators useful in the present invention include chemicals which decompose to produce free radicals under the foregoing reaction condition as well as various forms of actinic radiation such as ultraviolet light, X-rays and the various types of nuclear radiation. Preferred as free-radical initiators in the present invention are commonly used polymerization initiators including the peroxides, azo compounds and redox catalysts. Most preferred are the water-soluble initiators such as potassium persulfate, ammonium persulfate, sodium persulfate, hydrogen peroxide, potassium perphosphate and the like as well as the well-known water-soluble redox initiators. The free-radical initiator is most useful in the range of from about 0.01 part to 3 parts per hundred parts of monomer and more preferably from 0.05 part to 0.3 part per hundred of monomer.

Conventional emulsion polymerization buffers may be employed in the present process although they are not necessary for the practice of this invention. Buffers such as ammonia, $NaHCO_3$, $NH_4HCO_3$ and other water-soluble salts generally give slightly more stable latices. The pH of the polymerization mixture does not appear to be critical but it is known that a neutral or slightly acid polymerization mixture is desirable to minimize hydrolysis of the polymer ester groups.

In the novel polymerization process embodied herein the best results are obtained and the most stable latices result when mild but thorough agitation is employed. Stated differently, the most stable latices result from the process embodied herein when good mixing with low shear stirring is employed during the course of the polymerization. The use of high shear stirring is actually a convenient method to coagulate the latex if it is desired to do so either during or after completion of the polymerization reaction. The use of conventional emulsifiers as additional stabilizers after the completion of the polymerization reaction is within the scope of the present invention. Polymers resulting from the present process may be prepared in low or high conversion in a manner known to those skilled in the art. It is essential that the polymerization be carried to the desired degree of conversion in the presence of the insoluble soaps as sole emulsifier, however.

The vinyl acetate resins embodied herein may be isolated from their latices by the use of conventional methods of coagulation with such agents as sodium chloride, calcium carbonate, sodium carbonate, alcohols, hydrochloric acid, sulfuric acid and the like by procedures well known in the art. The vinyl acetate resin latices embodied herein can also be heat coagulated, shear coagulated, freeze coagulated, spray dried or coagulated through water evaporation in the form of films. The coagulated resin is conveniently isolated by filtration, centrifugation or decantation and may be dried in conventional drying equipment.

The insoluble soaps embodied herein may be used per se or they may be generated in situ in the polymerization mixture. The insoluble soap such as barium laurate may be generated in situ, for instance, by adding to the aqueous polymerization mixture substantially stoichiometric quantities of barium hydroxide and lauric acid.

The vinyl acetate resins embodied herein are distinguished from other conventional emulsion type vinyl acetate resins in that the latter are not spherical, uniform particle size resins. For example, polyvinyl acetate prepared with a conventional soluble soap emulsifier will usually have broad particle size distribution with the average particle size generally less than 5,000 A.

In the following examples which will serve to illustrate the process of the invention, the amounts of ingredients are expressed in parts by weight unless otherwise indicated.

*Example I*

The polymerization was run in a three-liter, three-neck flask. The flask was equipped with the following: thermometer, a mechanical stirrer consisting of a glass stirring rod and blade, water jacketed condenser, nitrogen sweeping tube and a hemispherical heating mantle. An electric motor with a mechanical speed reducer was used to drive the stirrer. The heating mantle was regulated by a conventional voltage regulator.

Under a nitrogen atmosphere, 1,200 grams of demineralized water was added to the flask. The water was boiled for about ten minutes and then allowed to cool to 55° C. Next, 2.0 grams of finely-divided barium laurate and 400 grams of distilled vinyl acetate monomer were added to the flask.

The monomer was prehomogenized by rapidly stirring the reaction mixture for one minute then following with quiescence for one minute. The stirring-quiescence alternation was repeated ten times.

The polymerization stirring speed was regulated to 115 r.p.m. 0.4 gram of dissolved potassium persulfate was added to the reaction mixture. The polymerization was run for 15.0 hours at 55° C.

The reaction mixture was allowed to slowly cool. Later the resulting polyvinyl acetate latex was removed from the flask.

A small sample of the latex was diluted with distilled water and the particle size was determined by depositing a small amount of the diluted latex on a microscope slide, covering the latex with a cover glass and taking a photomicrograph of the particles using an A. O. Spencer phase contrast optical microscope.

The latex particles were uniform spheres having a particle size of $3.5 \pm 0.2$ micron ($35,000 \pm 2,000$ A.).

The remaining latex was coagulated with calcium acetate. The polymer was washed two times with demineralized water. The polymer was dried under vacuum at 50° C. for 16 hours. From the weight of the coagulated polymer and from polymer that coagulated during the polymerization, a high conversion was calculated.

*Example II*

In this series of polymerizations various types of insoluble soaps were used as the sole emulsifier for vinyl acetate monomer. The polymerizations were identical to that described in Example I, except that barium laurate was replaced by another insoluble soap. The following insoluble soaps were used as emulsifiers for the polymerization of vinyl acetatae monomer: aluminum myristate, aluminum stearate, calcium laurate, calcium myristate, calcium palmitate, calcium stearate, lead laurate, lead stearate, magnesium laurate, magnesium myristate and magnesium stearate.

The above list of insoluble soaps which can be used as emulsifiers is not a complete list of all the insoluble soaps that can be used as the sole emulsifier in our invention, but serves only to illustrate the different types of insoluble soaps that are operative in our invention.

Every member of the foregoing series resulted in the formation of a uniform particle size polyvinyl acetate latex.

*Example III*

A series of polyvinyl acetate homopolymers were prepared according to the procedure of Example I from the following recipe:

Vinyl acetate (purified) _____ 100
Potassium persulfate _____ 0.10
Insoluble soap mixture _____ 0.50
Demineralized water _____ 300

The following insoluble soap mixtures were used as emulsifiers for this series of polymerizations:

(a)
Calcium laurate _____ 0.25
Magnesium laurate _____ 0.25
(b)
Barium laurate _____ 0.25
Barium stearate _____ 0.25
(c)
Cadmium stearate _____ 0.35
Calcium laurate _____ 0.15
(d)
Lead oleate _____ 0.35
Lithium laurate _____ 0.15

The polymerization of each member of this series resulted in the production of a spherical uniform particle size latex. This was shown by examining a sample of each of the latices under the optical microscope.

*Example IV*

A copolymer was prepared according to the procedure of Example I from the following recipe:

Vinyl acetate (distilled) _____ 60
Diethyl fumarate (purified) _____ 40
Potassium persulfate _____ 0.10
Calcium stearate _____ 0.50
Demineralized water _____ 300

The polymerization step described in Example I was used. A polymerization temperature of 50° C. was employed. The polymerization was carried to high conversion with the formation of a latex. Optical microscope analysis of the latex revealed that the latex was composed of spherical particles that were uniform in diameter.

*Example V*

A copolymer was prepared according to the procedure of Example I from the following recipe:

Vinyl acetate (purified) _____ 60
Ethyl acrylate (purified) _____ 40
Potassium persulfate _____ 0.10
Magnesium laurate _____ 0.50
Demineralized water _____ 300

The polymerization step described in Example I was used. A polymerization temperature of 50° C. was employed.

Particle size determination with the optical microscope showed that the resulting latex of this copolymerization was composed of spherical, uniform particles.

*Example VI*

Another copolymer was prepared according to the procedure of Example I from the following recipe:

Vinyl acetate (distilled) _____ 60
Diethyl maleate _____ 40
Potassium persulfate _____ 0.10
Lithium laurate _____ 0.25
Demineralized water _____ 300

The polymerization step described in Example I was used. A polymerization temperature of 50° C. was employed. Optical microscope analysis revealed that the resulting latex was composed of spherical, uniform particle size particles.

*Example VII*

A copolymer was prepared according to the procedure of Example I from the following recipe:

| | |
|---|---|
| Vinyl acetate (distilled) | 60 |
| Diethyl itaconate (purified) | 40 |
| Potassium persulfate | 0.10 |
| Lead stearate | 0.50 |
| Demineralized water | 300 |

The polymerization step described in Example I was employed. The polymerization was run at 50° C. The resulting latex was composed of spherical uniform particle size particles.

We claim:

1. The method for preparing an emulsion of a polyvinyl acetate resin composed of a family of spherical, uniform size particles having a diameter within the range of 0.1 to 10 microns, comprising polymerizing a mixture of from 60 to 100% by weight of vinyl acetate and from 0 to 40% by weight of at least one other monomer copolymerizable with vinyl acetate selected from the group consisting of alkyl esters of an alpha,beta olefinically unsaturated carboxylic acid wherein the carboxylic acid has from 3 to 6 carbon atoms and the alkyl ester group contains from 1 to 12 carbon atoms, in the presence of from 0.01 part to 3.0 parts by weight per 100 parts of the monomers of a free-radial catalyst and from 0.01 to 5.0 parts by weight per 100 parts of the monomers of an insoluble soap as the sole emulsifier said soap having a structure $(X-COO)_nM$ wherein X represents an alkyl group having from 7 to 21 carbon atoms and M is a member selected from the group consisting of lithium, barium, calcium, magnesium, cadmium, zinc, lead, tin and aluminum and $n$ is a whole number equal to the valence of M, with agitation in the substantial absence of oxygen at a temperature below about 100° C.

2. The method for preparing an emulsion of a polyvinyl acetate resin composed of a family of spherical, uniform size particles having a diameter within the range of 0.1 to 10 microns, comprising polymerizing vinyl acetate in water in the presence of from .01 to 3.0 parts by weight per 100 parts by weight of vinyl acetate of a free-radial catalyst and as the sole emulsifier from 0.01 to 5.0 parts by weight per 100 parts by weight of vinyl acetate of at least one insoluble soap having the structure $(X-COO)_nM$ wherein X represents an alkyl group having from 7 to 21 carbon atoms and M is a member selected from the group consisting of lithium, barium, calcium, magnesium, cadmium, zinc, lead, tin and aluminum and $n$ is a whole number equal to the valence of M, with agitation in the substantial absence of oxygen at a temperature below about 100° C.

3. The method for preparing an emulsion of a polyvinyl acetate resin composed of a family of spherical, uniform size particles having a diameter within the range of 0.1 to 10 microns, comprising polymerizing vinyl acetate in water in the presence of from .05 to 0.3 part by weight per 100 parts by weight of vinyl acetate of a free-radical catalyst and as the sole emulsifier from 0.1 to 2.0 parts by weight per 100 parts by weight of vinyl acetate of barium laurate with agitation in the substantial absence of oxygen at a temperature of from about 30° C. to 100° C.

4. The method for preparing an emulsion of a polyvinyl acetate resin composed of a family of spherical, uniform size particles having a diameter within the range of 0.1 to 10 microns, comprising polymerizing a monomer mixture of 60% to 100% by weight of vinyl acetate and 0 to 40% by weight of diethyl fumarate in water in the presence of from .05 to 0.3 part by weight per 100 parts by weight of said mixture of a free-radical catalyst and as the sole emulsifier from 0.1 to 2.0 parts by weight per 100 parts by weight of said mixture of calcium stearate with agitation in the substantial absence of oxygen at a temperature of from about 30° C. to 100° C.

5. The method for preparing an emulsion of a polyvinyl acetate resin composed of a family of spherical, uniform size particles having a diameter within the range of 0.1 to 10 microns, comprising polymerizing a monomer mixture of 60% to 100% by weight of vinyl acetate and 0 to 40% by weight of ethyl acrylate in water in the presence of from .05 to 0.3 part by weight per 100 parts by weight of said mixture of a free-radical catalyst and as the sole emulsifier from 0.1 to 2.0 parts by weight per 100 parts by weight of said monomer mixture of magnesium laurate with agitation in the substantial absence of oxygen at a temperature of from 30° C. to 100° C.

6. The method for preparing an emulsion of a polyvinyl acetate resin composed of a family of spherical, uniform size particles having a diameter within the range of 0.1 to 10 microns, comprising polymerizing a monomer mixture of 60% to 100% by weight of vinyl acetate and 0 to 40% by weight of diethyl maleate in water in the presence of from .05 to 0.3 part by weight per 100 parts by weight of said mixture of a free-radical catalyst and as the sole emulsifier from 0.1 to 2.0 parts by weight per 100 parts by weight of said monomer mixture of lithium laurate with agitation in the substantial absence of oxygen at a temperature of from 30° C. to 100° C.

7. The method for preparing an emulsion of a polyvinyl acetate resin composed of a family of spherical, uniform size particles having a diameter within the range of 0.1 to 10 microns, comprising polymerizing a monomer mixture of 60% to 100% by weight of vinyl acetate and 0 to 40% by weight of diethyl itaconate in water in the presence of from .05 to 0.3 part by weight per 100 parts by weight of said mixture of a free-radical catalyst and as the sole emulsifier from 0.1 to 2.0 parts by weight per 100 parts by weight of said monomer mixture of lead stearate with agitation in the substantial absence of oxygen at a temperature of from 30° C. to 100° C.

8. The method for preparing an emulsion of a vinyl ester resin composed of a family of spherical, uniform size particles having a diameter within the range of 0.1 to 10 microns, which method comprises polymerizing a monomer mixture of from 60 to 100% by weight of at least one vinyl ester selected from the group consisting of vinyl acetate, vinyl propionate, vinyl butyrate, vinyl benzoate, vinyl laurate, isopropenyl acetate and isopropenyl caproate, and from 0 to 40% by weight of at least one other monomer copolymerizable with said vinyl ester and which contains a grouping selected from the class consisting of

and

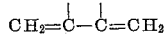

said monomer mixture being agitated in admixture with water containing as the sole emulsifying agent an insoluble metallic soap which is the salt of a polyvalent metal and a fatty acid having from 8 to 22 carbon atoms.

9. The method for preparing an emulsion of a vinyl acetate resin composed of a family of spherical, uniform size particles having a diameter within the range of 0.1 to 10 microns, which method comprises polymerizing, at a temperature below about 100° C. and in the substantial absence of oxygen, a monomer mixture of from 60 to 100% by weight of vinyl acetate, and from 0 to 40% by weight of at least one other monomer copolymerizable with vinyl acetate and which contains a grouping selected from the class consisting of

and

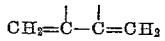

said monomer mixture being agitated in admixture with water containing as the sole emulsifying agent from 0.01 to 5 parts per 100 parts by weight of monomers of an insoluble metallic soap which is the salt of a polyvalent metal and a fatty acid having from 8 to 22 carbon atoms.

10. The method of claim 9 wherein the insoluble soap is a salt of barium and a fatty acid having from 8 to 22 carbon atoms.

11. The method of claim 9 wherein the insoluble soap is a salt of aluminum and a fatty acid having from 8 to 22 carbon atoms.

12. The method of claim 9 wherein the insoluble soap is a salt of cadmium and a fatty acid having from 8 to 22 carbon atoms.

13. The method of claim 9 wherein the insoluble soap is a salt of calcium and a fatty acid having from 8 to 22 carbon atoms.

14. The method of claim 9 wherein the insoluble soap is a salt of lead and a fatty acid having from 8 to 22 carbon atoms.

15. The method of claim 9 wherein the insoluble soap is a salt of magnesium and a fatty acid having from 8 to 22 carbon atoms.

16. The method of claim 9 wherein the insoluble soap is a salt of tin and a fatty acid having from 8 to 22 carbon atoms.

17. The method of claim 9 wherein the insoluble soap is a salt of zinc and a fatty acid having from 8 to 22 carbon atoms.

References Cited by the Examiner
UNITED STATES PATENTS

| | | | |
|---|---|---|---|
| 2,485,616 | 10/49 | Long et al. | 260—92.8 |
| 2,569,447 | 10/51 | Borglin et al. | 260—92.8 |
| 2,934,529 | 4/60 | Van Dijk | 260—92.8 |

JOSEPH L. SCHOFER, *Primary Examiner.*

J. R. LIBERMAN, WILLIAM H. SHORT, *Examiners.*

UNITED STATES PATENT OFFICE
CERTIFICATE OF CORRECTION

Patent No. 3,196,134                          July 20, 196

Frank J. Donat et al.

It is hereby certified that error appears in the above numbered patent requiring correction and that the said Letters Patent should read as corrected below.

Column 4, lines 68 and 69, for "calcium carbonate," read -- calcium acetate, --; column 5, line 65, for "acetatae" read -- acetate --.

Signed and sealed this 8th day of February 1966.

(SEAL)
Attest:

ERNEST W. SWIDER                         EDWARD J. BRENNER
Attesting Officer                           Commissioner of Patents